(12) United States Patent
Demiralp (10) Patent No.: US 12,182,109 B1
(45) Date of Patent: Dec. 31, 2024

(54) AUGMENTING DECISION MAKING VIA INTERACTIVE WHAT-IF ANALYSIS

(71) Applicant: SIGMA COMPUTING, INC., San Francisco, CA (US)

(72) Inventor: Çağatay Demiralp, Austin, TX (US)

(73) Assignee: SIGMA COMPUTING, INC., San Francisco, CA (US)

( * ) Notice: Subject to any disclaimer, the term of this patent is extended or adjusted under 35 U.S.C. 154(b) by 0 days.

(21) Appl. No.: 17/941,393

(22) Filed: Sep. 9, 2022

(51) Int. Cl.
G06F 16/24 (2019.01)
G06F 16/242 (2019.01)
G06F 16/2455 (2019.01)
G06F 16/248 (2019.01)
G06N 20/00 (2019.01)

(52) U.S. Cl.
CPC ...... G06F 16/2428 (2019.01); G06F 16/2455 (2019.01); G06F 16/248 (2019.01); G06N 20/00 (2019.01)

(58) Field of Classification Search
CPC ............ G06F 16/2428; G06F 16/2455; G06F 16/248; G06F 16/2423; G06N 20/00
See application file for complete search history.

(56) References Cited

U.S. PATENT DOCUMENTS

| 7,013,312 | B2 * | 3/2006 | Bala ................... G06F 40/18 |
| 7,921,200 | B2 | 4/2011 | Dieberger et al. |
| 10,740,404 | B1 * | 8/2020 | Hjermstad ............ G06F 16/909 |
| 10,891,335 | B2 | 1/2021 | Cavallo et al. |
| 11,327,944 | B1 | 5/2022 | Payonk et al. |
| 11,561,967 | B2 * | 1/2023 | Seiden .............. G06F 16/24573 |
| 2012/0130979 | A1 | 5/2012 | Williamson |
| 2013/0093402 | A1 | 4/2013 | Akahane |
| 2015/0006433 | A1 | 1/2015 | Phillips et al. |
| 2016/0104076 | A1 | 4/2016 | Maheshwari et al. |
| 2016/0104093 | A1 | 4/2016 | Fletcher et al. |
| 2016/0105338 | A1 | 4/2016 | Fletcher et al. |

(Continued)

OTHER PUBLICATIONS

Cavallo et al., "A Visual Interaction Framework for Dimensionality Reduction Based Data Exploration," Conference on Human Factors in Computing Systems (CHI), Apr. 21-26, 2018, Montreal, QC, Canada, https://arxiv.org/pdf/1811.12199.pdf, 13 pages.

(Continued)

*Primary Examiner* — Merilyn P Nguyen (57) ABSTRACT

Augmenting decision-making via interactive what-if analysis including presenting, by a query execution engine, via a graphical user interface, a constrained analysis view that indicates a set of values for a plurality of driver variables, where the graphical user interface receives requests for data and present data; receiving a state specification of the graphical user interface that includes a constraint on a value of a driver variable of the plurality of driver variables; generating, by the query execution engine, a database query using the received state specification that is composed to retrieve a query result from a cloud-based data warehouse; based on the query result, calculating an updated set of values for the plurality of driver variables that result in an optimized value for the target variable while the constraint on the driver variable is in effect; and presenting the updated set of values in an updated view.

20 Claims, 7 Drawing Sheets

(56) References Cited

U.S. PATENT DOCUMENTS

| | | | |
|---|---|---|---|
| 2018/0024901 A1 | 1/2018 | Tankersley et al. | |
| 2018/0158079 A1* | 6/2018 | Chu et al. | |
| 2020/0027137 A1* | 1/2020 | Miller | G06Q 30/0277 |
| 2020/0293587 A1 | 9/2020 | Ayers et al. | |
| 2020/0403862 A1 | 12/2020 | Erblat et al. | |
| 2021/0224288 A1* | 7/2021 | Seiden | G06F 16/24522 |
| 2021/0390451 A1 | 12/2021 | Kisamori et al. | |
| 2022/0107945 A1* | 4/2022 | Seiden | G06F 16/24534 |
| 2022/0179862 A1 | 6/2022 | Singh et al. | |
| 2023/0083404 A1 | 3/2023 | Dong et al. | |
| 2023/0289698 A1 | 9/2023 | Bly et al. | |

OTHER PUBLICATIONS

Gathani et al., "Augmenting Decision Making via Interactive What-If Analysis," 12th Annual Conference on Innovative Data Systems Research (CIDR '22), Jan. 9-12, 2022, Chaminade, CA, USA, 8 pages.

Hulsebos et al., "Making Table Understanding Work in Practice," https://arxiv.org/pdf/2109.05173.pdf, 12th Annual Conference on Innovative Data Systems Research (CIDR '22), Jan. 9-12, 2022, Chaminade, CA, USA, 6 pages.

* cited by examiner

AUGMENTING DECISION MAKING VIA INTERACTIVE WHAT-IF ANALYSIS

BACKGROUND

Field of the Invention

The field of the invention is data processing, or, more specifically, methods, apparatus, and products for augmenting decision-making via interactive what-if analysis.

Description of Related Art

Modern businesses may store large amounts of data in remote databases within cloud-based data warehouses. This data may be accessed using database query languages, such as structured query language (SQL). Queries may be used to retrieve data that is then analyzed to make decisions, such as business decisions. Manipulating the data stored in the database may require constructing complex queries beyond the abilities of most users. Further, it may be difficult to quickly gain actionable insights from the retrieved data that can be used to make decisions.

SUMMARY

Methods, systems, and apparatus for augmenting decision-making via interactive what-if analysis are disclosed. Augmenting decision-making via interactive what-if analysis includes presenting, by a query execution engine, via a graphical user interface, a constrained analysis view that indicates a set of values for a plurality of driver variables, where the graphical user interface receives requests for data and present data; receiving a state specification of the graphical user interface that includes a constraint on a value of a driver variable of the plurality of driver variables; generating, by the query execution engine, a database query using the received state specification that is composed to retrieve a query result from a cloud-based data warehouse; based on the query result, calculating an updated set of values for the plurality of driver variables that result in an optimized value for the target variable while the constraint on the driver variable is in effect; and presenting the updated set of values in an updated view.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
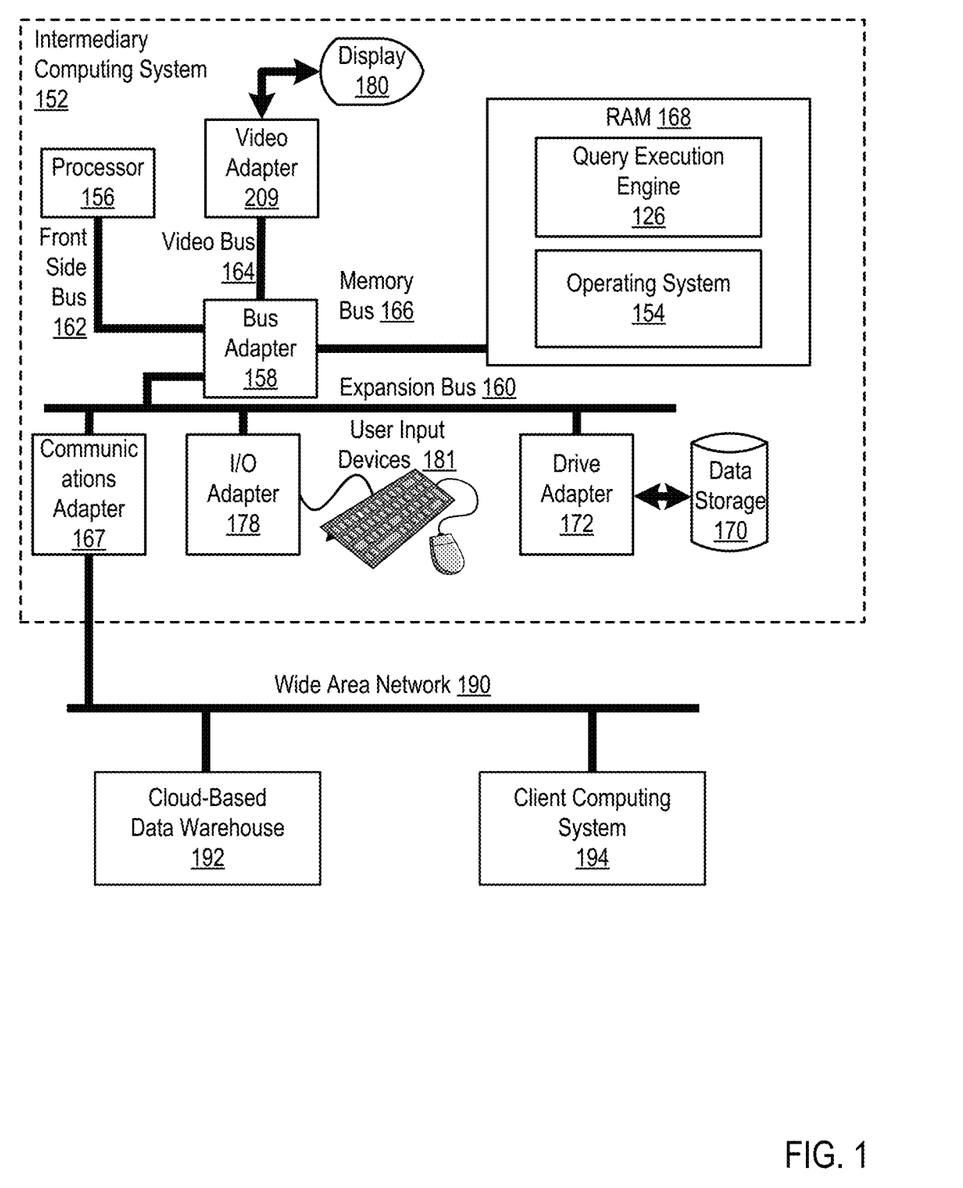
FIG. 1 sets forth a block diagram of an example system configured for augmenting decision-making via interactive what-if analysis according to embodiments of the present invention.

Exemplary methods, apparatus, and products for augmenting decision-making via interactive what-if analysis in accordance with the present invention are described with reference to the accompanying drawings, beginning with FIG. 1. FIG. 1 sets forth a block diagram of automated computing machinery comprising an exemplary intermediary computing system 152 configured for augmenting decision-making via interactive what-if analysis according to embodiments of the present invention. The intermediary computing system 152 of FIG. 1 includes at least one computer processor 156 or 'CPU' as well as random access memory 168 (RAM') which is connected through a high speed memory bus 166 and bus adapter 158 to processor 156 and to other components of the intermediary computing system 152.

Stored in RAM 168 is an operating system 154. Operating systems useful in computers configured for augmenting decision-making via interactive what-if analysis according to embodiments of the present invention include UNIX, Linux, Microsoft Windows™, AIX™ and others as will occur to those of skill in the art. The operating system 154 in the example of FIG. 1 is shown in RAM 168, but many components of such software typically are stored in non-volatile memory also, such as, for example, on data storage 170, such as a disk drive. Also stored in RAM is the query execution engine 126, a module for augmenting decision-making via interactive what-if analysis according to embodiments of the present invention.

The intermediary computing system 152 of FIG. 1 includes disk drive adapter 172 coupled through expansion bus 160 and bus adapter 158 to processor 156 and other components of the intermediary computing system 152. Disk drive adapter 172 connects non-volatile data storage to the intermediary computing system 152 in the form of data storage 170. Disk drive adapters useful in computers configured for augmenting decision-making via interactive what-if analysis according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example intermediary computing system 152 of FIG. 1 includes one or more input/output ('I/O') adapters 178. I/O adapters implement user-oriented input/output through, for example, software drivers and computer hardware for controlling output to display devices such as computer display screens, as well as user input from user input devices 181 such as keyboards and mice. The example intermediary computing system 152 of FIG. 1 includes a video adapter 209, which is an example of an I/O adapter specially designed for graphic output to a display device 180 such as a display screen or computer monitor. Video adapter 209 is connected to processor 156 through a high speed video bus 164, bus adapter 158, and the front side bus 162, which is also a high speed bus.

The exemplary intermediary computing system 152 of FIG. 1 includes a communications adapter 167 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for augmenting decision-making via interactive what-if analysis according to embodiments of the present invention include modems for wired dial-up communications, Ethernet (IEEE 802.3) adapters for wired data communications, and 802.11 adapters for wireless data communications.

The communications adapter 167 is communicatively coupled to a wide area network 190 that also includes a cloud-based data warehouse 192 and a client computing system 194. The cloud-based data warehouse 192 is a computing system or group of computing systems that hosts a database or databases for access over the wide area network 190. The client computing system 194 is a computing system that accesses the database using the query execution engine 126. Although FIG. 1 depicts the query execution engine within the intermediary computing system 152, the query execution engine may alternatively be executed within the client computing system 194.

Figure 2:
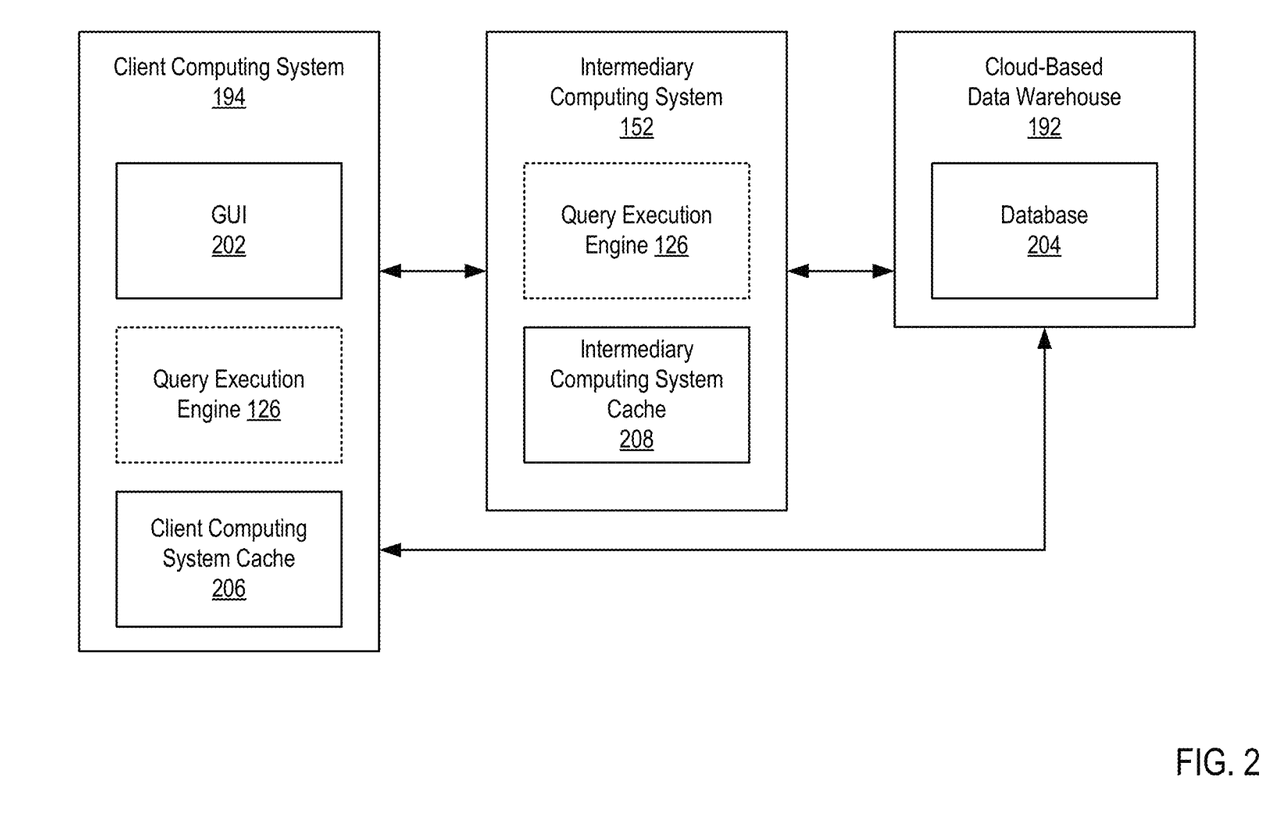
FIG. 2 sets forth a block diagram of an example system configured for augmenting decision-making via interactive what-if analysis according to embodiments of the present invention.

FIG. 2 shows an exemplary system for augmenting decision-making via interactive what-if analysis according to embodiments of the present invention. As shown in FIG. 2, the system includes a client computing system 194, an intermediary computing system 152, and a cloud-based data warehouse 192. The client computing system 194 includes a graphical user interface (GUI) 202 and a client computing system cache 206. The intermediary computing system 152 includes an intermediary computing system cache 208. The cloud-based data warehouse 192 includes a database 204. The query execution engine 126 may reside on either the client computing system 194 and/or the intermediary computing system 152 and utilize the associated computing system cache (client computing system cache 206, intermediary computing system cache 208). The cache may be a browser cache associated with an Internet browser. The client computing system 194 may access the cloud-based data warehouse 192 and database 204 directly or may access the cloud-based data warehouse 192 and database 204 via the intermediary computing system 152.

The GUI 202 is a visual presentation configured to present data sets in the form of worksheets and graphical elements to a user. The GUI 202 also receives requests from a user for data sets from the database 204. The GUI 202 may be presented, in part, by the query execution engine 126 and displayed on a client computing system 194 (e.g., on a system display or mobile touchscreen). The GUI 202 may be part of an Internet application that includes the query execution engine 126 and is hosted on the intermediary computing system 152. Alternatively, the GUI 202 may be part of an Internet application that includes the query execution engine 126 and is hosted on the client computing system 194.

The database 204 is a collection of data and a management system for the data. A data set is a collection of data (such as a table) from the database 204. Data sets may be organized into columns and rows (also referred to as records). The particular columns, rows, and organization of the columns and rows that make up a data set may be specified in the database statement requesting the data set. A data set, as sent from the database to the intermediary computing system 152 and client computing system 194, may be a portion or subset of a source database table on the database. Data sets may be sent from the cloud-based data warehouse 192 in response to a database query. Accordingly, data sets retrieved in response to a database query may be referred to as query results.

The query execution engine 126 is hardware, software, or an aggregation of hardware and software configured to receive a state specification from the client computing system 194, via the GUI 202. The query execution engine 126 is also configured to generate database queries in response to manipulations of the GUI 202 described in the state specification.

The state specification is a collection of data describing inputs into the GUI 202. The state specification may include manipulations of GUI elements within the GUI 202 along with data entered into the GUI 202 by a user of the client computing system 194. Such manipulations and data may indicate requests for and manipulations of data sets. The state specification may be a standard file format used to exchange data in asynchronous browser-server communication. For example, the state specification may be a JavaScript Object Notation specification.

The state specification may include descriptions of elements that are used to apply changes to the data set. Such elements may include filters applied to the worksheet, the hierarchical level of the worksheet, joins performed within the worksheet, exposable parameters in the worksheet, and security for the worksheet.

The query execution engine 126 uses the state specification as input to generate a database query. This transformation process may begin with state specification being converted into an abstract syntax tree. The abstract syntax tree may then be canonicalized into a canonicalized hierarchy. The canonicalized hierarchy may then be linearized into the worksheet algebra. The worksheet algebra may then be lowered into a relational algebra, which may then be lowered into the database query.

The query execution engine 126 may use the database query to fetch query results (i.e. a data set) from the database 204. The query execution engine 126 may then present the query results to a user via the GUI 202. The query execution engine 126 may also store the query results in a cache (client computing system cache 206, intermediary computing system cache 208) for later retrieval if the same or similar query is generated from a state specification. Further, as described below, the query execution engine 126 may expand the generated database queries such that the expanded results stored in the cache may be used to locally service a greater number of database queries without sending additional database queries to the cloud-based data warehouse 192.

Figure 3:
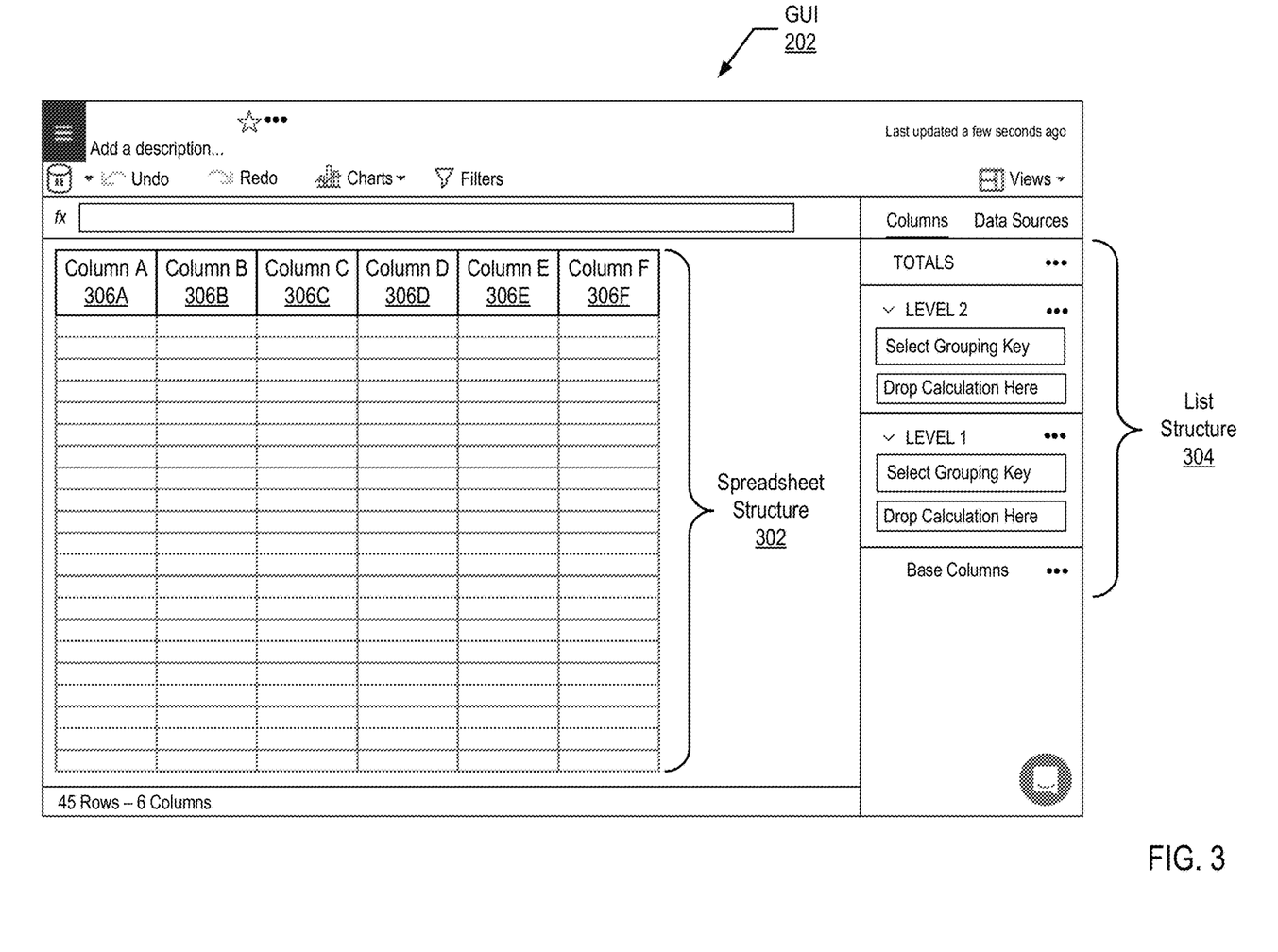
FIG. 3 sets forth a block diagram of an example system configured for augmenting decision-making via interactive what-if analysis according to embodiments of the present invention.

FIG. 3 shows an exemplary system for augmenting decision-making via interactive what-if analysis according to embodiments of the present invention. As shown in FIG. 3, the exemplary GUI 202 includes a spreadsheet structure 302 and a list structure 304. The spreadsheet structure 302 includes a worksheet (shown as empty rows) with six columns (column A 306A, column B 306B, column C 306C, column D 306D, column E 306E, column F 306F).

The spreadsheet structure 302 is a graphical element and organizing mechanism for a worksheet that presents a data set. A worksheet is a presentation of a data set (such as a table) from a database on a data warehouse. The spreadsheet structure 302 displays the worksheet as rows of data organized by columns (column A 306A, column B 306B, column C 306C, column D 306D, column E 306E, column F 306F). The columns delineate different categories of the data in each row of the worksheet. The columns may also be calculation columns that include calculation results using other columns in the worksheet.

The list structure 304 is a graphical element used to define and organize the hierarchical relationships between the columns (column A 306A, column B 306B, column C 306C, column D 306D, column E 306E, column F 306F) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure 304 presents a dimensional hierarchy to the user. Specifically, the list structure 304 presents levels arranged hierarchically across at least one dimension. Each level within the list structure 304 is a position within a hierarchical relationship between columns (column A 306A, column B 306B, column C 306C, column D 306D, column E 306E, column F 306F). The keys within the list structure 304 identify the one or more columns that are the participants in the hierarchical relationship. Each level may have more than one key.

One of the levels in the list structure 304 may be a base level. Columns selected for the base level provide data at the finest granularity. One of the levels in the list structure 304 may be a totals or root level. Columns selected for the totals level provide data at the highest granular level. For example, the totals level may include a field that calculates the sum of each row within a single column of the entire data set (i.e., not partitioned by any other column).

The GUI 202 may enable a user to drag and drop columns (column A 306A, column B 306B, column C 306C, column D 306D, column E 306E, column F 306F) into the list structure 304. The order of the list structure 304 may specify the hierarchy of the columns relative to one another. A user may be able to drag and drop the columns in the list structure 304 at any time to redefine the hierarchical relationship between columns. The hierarchical relationship defined using the columns selected as keys in the list structure 304 may be utilized in charts such that drilling down (e.g., double click on a bar), enables a new chart to be generated based on a level lower in the hierarchy.

The GUI 202 may also include a mechanism for a user to request a table from a database to be presented as a worksheet in the GUI 202. Such a mechanism may be part of the interactivity of the worksheet. Specifically, a user may manipulate a worksheet (e.g., by dragging and dropping columns or rows, resorting columns or rows, etc.) and, in response, the GUI 202 may generate a request (e.g., in the form of a state specification) for a data set and send the request to the query execution engine 126. Such a mechanism may also include a direct identification of the rows and columns of a database table that a user would like to access (e.g., via a selection of the rows and columns in a dialog box).

The query execution engine may enable business users to perform decision analysis tasks in order to make more informed business decisions. As an example, a user may wish to determine a budget for a certain type of advertising or type of marketing function so as to achieve a particular business goal (e.g., a target number of customer renewals, a target number of new customers, a target number of subscription upgrades, etc.). The user may have a fixed marketing and advertising budget and wish to know whether to prioritize certain marketing/advertising functions over others. In order to discover the relationship between data attributes hypothesized to be driver variables and those actually corresponding to target variables, business users may need to perform lengthy exploratory analyses. Such analysis may be challenging and include consideration of multitudes of combinations, scenarios, and transformations of the data.

In some implementations, the system described herein enables a user to perform different types of decision analysis using data stored on a cloud-based data warehouse without having to perform complex data analysis operations. In the case of a decision analysis that is a driver importance analysis, the user interface may be configured to present driver importance data corresponding to driver variables that affect the value of a target variable. This importance data may include importance values for each driver variable that is hypothesized to impact the value of a target variable. In the case of a decision analysis that is a sensitivity analysis, the user interface may be configured to present determinations of how sensitive a target variable is to changes in a driver variable's value. In the case of a decision analysis that is a target inversion analysis, the user interface may be configured to present target values for each driver variable to achieve a particular target variable value. In the case of a decision analysis that is a constrained analysis, the user interface may also provide the ability to apply constraints to one or more values (e.g., for driver variables) and determine the impact of those constraints on the target variable.

Figure 4:
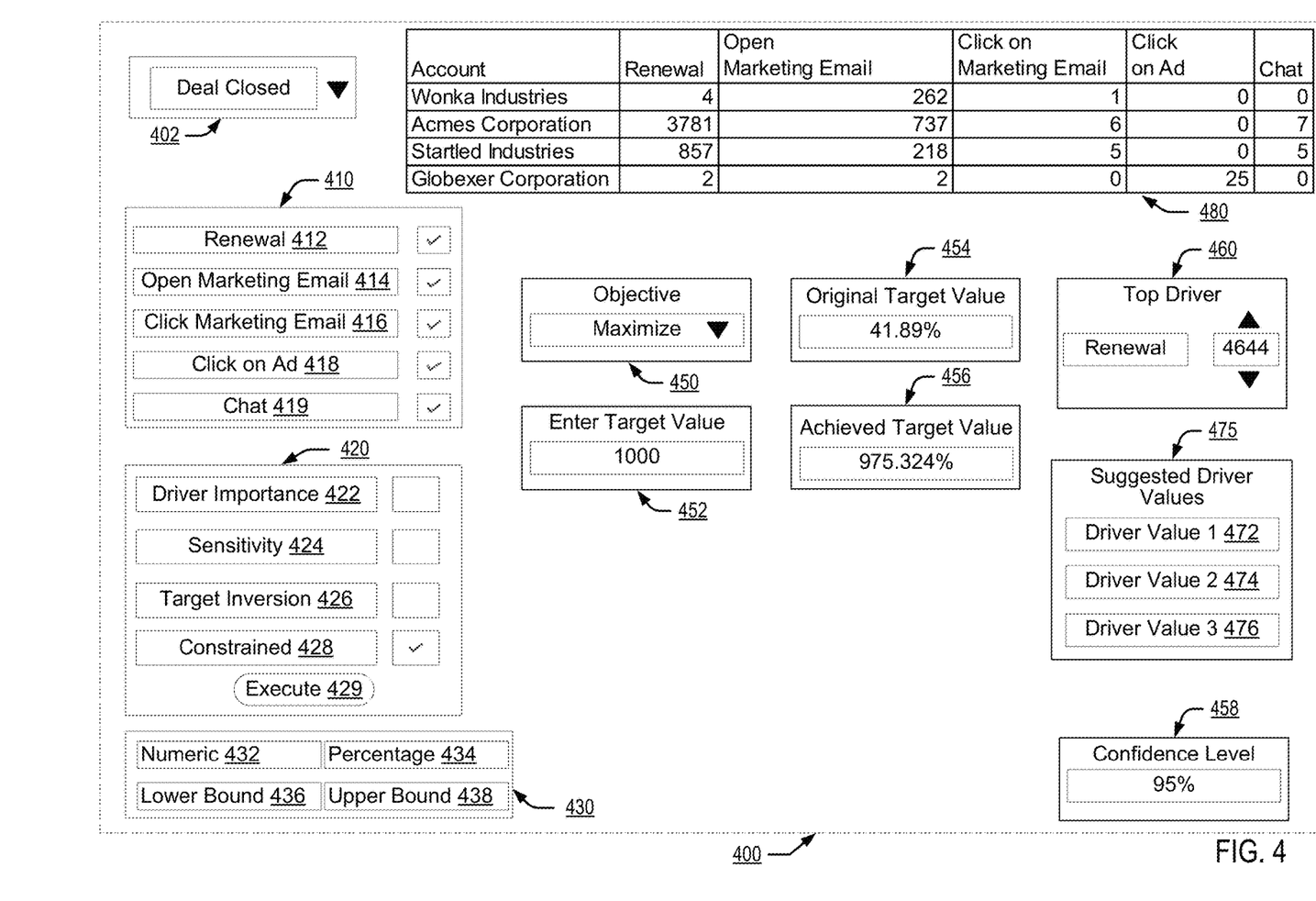
FIG. 4 sets forth a block diagram of an example system configured for augmenting decision-making via interactive what-if analysis according to embodiments of the present invention.

Readers will appreciate that the user interface 400 enables a user to query a database, retrieve data, and view decision analysis data using graphical element inputs provided to the user interface 400, thus obviating the need for a business user to perform the complex data analysis operations required to obtain actionable decision analysis insights from the database.

In some implementations, one or more components of the intermediary computing system (e.g., the query execution engine 126) execute a machine learning system. The machine learning system may be configured to ingest data pertaining to target variables, driver variables, and other data, and output results obtained from processing the inputted data using one or more machine learning models. The target variable may represent a data point corresponding to performance indicator for a business, such as an amount or rate of deal closings for the business. In some implementations, the intermediary computing system may implement various machine learning models such as linear regression models, random forest classifier models, and the like. The implemented machine learning models may be configured to output driver importance values indicating the importance, relevance, or correlation of a driver variable to a target variable.

In some implementations, driver importance values are feature correlation coefficients relative to a target variable. In other words, the driver importance values indicate the degree to which a driver variable is correlated with a target variable. The implemented machine learning models may also be configured to output updated target values that are generated using perturbed (changed) values of driver variables. The implemented machine learning models may also be configured to output hypothetical driver variable values that would be required to attain a certain goal, such as a maximum possible value for a target variable. A machine learning model may be trained using driver variable data and target variable data. The data may be historical data obtained from, for example, various business cases that show particular historic values for driver variables that occurred in conjunction with a particular target variable.

FIG. 4 sets forth a block diagram of an example user interface 400 configured for augmenting decision-making via interactive what-if analysis according to embodiments of the present invention. The user interface 400 may be similar to GUI 202, described above. The user interface 400 may be presented on a display device associated with the client computing system 194. In some implementations, the presentation of the user interface 400 is provided to the client computing system 194 by one or more of the intermediary computing system 152 and the cloud-based data warehouse 192. In other words, the client computing system 194 may just present the user interface 400 whereas the functionality and contents of the user interface 400 are provided by components of the intermediary computing system 152 and/or the cloud-based data warehouse 192.

The user interface 400 may be part of an Internet application that includes the query execution engine 126 and is hosted on the intermediary computing system 152. Alternatively, the user interface 400 may be part of an Internet application that includes the query execution engine 126 and is hosted on the client computing system 194. The query execution engine 126 may use database queries that are generated based on inputs received via the user interface 400. The queries may be, for example, SQL queries. These inputs (also referred to herein as a state specification) may then be used to fetch query results (i.e. a data set) from the database 204. The query execution engine 126 may then present the query results to a user via the user interface 400.

As shown in FIG. 4, the user interface 400 includes a target variable selection element 402, driver variable selection elements 410, decision analysis selection elements 420, constrained analysis elements 430, target seeking element 450, target value entry element 452, original target value element 454, achieved target value element 458, confidence level element 458, top driver element 460, suggested driver value elements 475, and dataset table view 480. In some implementations, the target variable selection element 402, driver variable selection elements 410, decision analysis selection elements 420, target seeking element 450, target value entry element 452, original target value element 454, achieved target value element 458, confidence level element 458, top driver element 460, suggested driver value elements 475, and dataset table view 480 all comprise one or more interactive graphical user interface elements that can be used to retrieve, view, select, and/or modify data from the cloud-based data warehouse 192.

These interactive graphical user interface elements may include, without limitation, any of buttons, checkboxes, keypads, sliders, dials, arrow keys, radio buttons, list pickers, text input boxes, and the like. For example, the driver variable selection elements 410 may provide, as shown, checkboxes that, when selected, enable selection of a particular driver variable. Based on the selection of a checkbox for a driver variable, the user interface 400 may be configured to generate a query that includes data for that driver variable. For example, the query may be constructed to obtain an importance value of the selected driver variable to a target variable. Similarly, an entry of a numeric input in the user interface 400 can be included in a state specification that, when provided to a query execution engine, causes execution of a query including the numeric input against data in the cloud-based data warehouse 192.

In some implementations, the user interface 400 may be configured to operate on a device that includes a touch-sensitive display screen. In such a case, the user interface 400 may be configured to receive touch inputs via the various graphical elements of user interface 400. Similar to the above examples referring to checkboxes or text input boxes, touch inputs may also be included in a state specification that, when provided to a query execution engine, causes execution of a query including the input against data in the cloud-based data warehouse 192.

As described above, the user interface 400 includes target variable selection element 402. A user can select a target variable using target variable selection element 402. Based on the selection, the user interface 400 may be configured to generate a state specification that includes the input, and send the state specification to the query execution engine 126. In one embodiment, the abovementioned state specification represents a query that, when executed, retrieves a dataset including each driver variable associated with the selected target variable. The user interface 400 may be configured to present a list of the driver variables associated with the selected target variable using driver variable selection elements 410.

As shown, the user interface 400 also includes driver variable selection elements 410. These include variable selection elements 412, 414, 416, 418, and 419, which respectively correspond to the driver variables "Renewal", "Open Marketing Email", "Click Marketing Email", "Click on Ad", and "Chat". As a real-world example, the "Open Marketing Email" driver variable may correspond to a number of times customers (or prospective customers) belonging to various customer accounts have opened marketing emails. Readers will appreciate that the number of marketing emails may be a driver variable that has some correlation with a target variable such as the number of "Deal Closed" events. For example, if a greater number of marketing emails are opened by certain customers, that may bear a positive correlation with the number of deals the customers close or are interested in closing with the business whose data is being presented by the user interface 400.

In some implementations, the driver variable selection elements 410 represent driver variables associated with the variable that was selected using target variable selection element 402. In other implementations, the driver variable selection elements 410 represent all known driver variables that are associated with any target variable. The user interface 400 provides the ability to select one or more driver variables (e.g., using checkboxes), and deselect any driver variables that the user is not interested in analyzing.

In some implementations, selecting a driver variable using driver variable selection elements 410 causes the user interface 400 to include values of the driver variable in subsequent queries. For example, and as described below in further detail, a user may wish to obtain driver variable values that would be required to attain a certain goal, such as a maximum target variable value. In some implementations, the driver variable values that are returned are just for driver variables that correspond to the driver variables selected using driver variable selection elements 410. In other implementations, the driver variable values that are returned are for all driver variables that have any correlation to the target variable selected using target variable selection element 410.

As shown, the user interface 400 also includes decision analysis selection elements 420. In some implementations, decision analysis selection elements 420 can be used to select the type of decision analysis desired by a user. As shown, the possible decision analysis types are "Driver Importance", "Sensitivity", "Target seeking", and "Constrained", which correspond to selection elements 422, 424, 426, and 428, respectively. Decision analysis selection elements 420 may also include an "Execute" element 429, whose selection may cause the user interface 400 to present the corresponding decision analysis view. In other embodiments, presentation of and selection of the "Execute" element 429 may not be provided, such that selection of the selection element for the desired decision analysis causes its presentation on the user interface 400.

In some implementations, a user may wish to hypothesize regarding a scenario that involves a certain value of a target variable. Within this hypothetical scenario, the user may wish to understand the values of driver variables that would be required for the target variable to attain a certain value. As an example, the user may observe that the target variable has a certain value that is its current value. But the user may wish to determine how to maximize the value of that target variable. Accordingly, the user may wish to know the values that the driver variables will need to have in order for the target variable to have a maximum value. Readers will appreciate that such a hypothetical analysis may be referred to as a target seeking analysis where the user is trying to determine the precise scenario or scenarios that will result in a specific target value.

In other words, a target seeking analysis asks: given a certain target variable value, what driver variable values would be required to achieve that target variable value? Once the hypothetical target variable value or target variable state is provided, the user interface 400 may be configured to generate a state specification that can be used to generate a query (e.g., by the query execution engine 126). The generated query is used to query a cloud-based data warehouse (e.g., cloud-based data warehouse 192) to obtain a dataset that includes driver variables and driver variable values that correlate with the target variable. A machine learning system then processes the data using one or more machine learning models that ingest this dataset and output the driver variable values that would be correlated with, for example, a maximum value for the target variable. Readers will further appreciate that the abovementioned target seeking analysis is an inverse of a driver importance analysis where a user wishes to determine a specific target variable value given certain values of driver variables that the user provides.

In addition, the user may wish to perform decision analysis using a hypothetical target value or target optimization, but subject to specific constraints. Generally, a business user may have specific domain knowledge regarding a particular business area (e.g., the relevance of online advertising to the business's growth). Such domain knowledge may inform the business user's decision making. Accordingly, while a machine learning model may be able to provide driver variable values for a target variable using all available historical data, the user may wish to constrain the machine learning calculations in specific ways. For example, based on the historical data, the machine learning model may calculate that a particular driver variable (e.g., "Open Marketing Email") has a driver importance value of 0.08. But the user may have domain knowledge or awareness (e.g., through other research or experience) that, generally, email recipients open marketing emails no more than 50% of the time. Additionally, the user may wish to determine whether a specific value for a target variable (e.g., 100 Deal Closings this month) will be met. Accordingly, the user may enter constraints on the Open Marketing Email driver variable using perturbation analysis selection elements 430 (e.g., constraining the Open Marketing Email variable to 50%). The user interface 400 may be configured to provide the constraint values to the query execution engine 126, which in turn executes a query whose results indicate whether the target value will be met given the constraints applied by the user.

Accordingly, the user interface 400 also provides the ability to provide changes to or constraints on the value of a driver variable through constrained analysis elements 430. A user can select a driver variable (using driver variable selection elements 410) and then enter values using text input or through graphical elements (e.g., a slider) that represent constraints on a value for the selected driver variable. To provide constrained analysis functionality, the user interface 400 provides element 436 corresponding to "Lower Bound". A user can use element 436 to provide, for example, a floor value or lowest possible value for a driver variable. For example, the user may be an experienced business professional whose domain knowledge indicates that a driver variable's value does not drop below a certain lower bound under typical conditions, or that any scenario involving a value lower than the lower bound would not be useful to the business user. Accordingly, the user can use the element 436 to enter a lower bound value that imposes a floor constraint on the value of the driver variable. As a result, any machine learning function that is executing to output a target value (given certain driver variable values) or updated driver variable values (in a target seeking scenario) will calculate the requested values based on the floor constraint on the driver variable's value.

The user interface 400 also provides element 438 corresponding to "Upper Bound". A user can use element 438 to provide, for example, a ceiling value or highest possible value for a driver variable. For example, the user may be an experienced business professional whose domain knowledge indicates that a driver variable's value does not exceed a certain upper bound under typical conditions, or that there are real-world limitations (e.g., budget constraints) on the value of a driver variable. Accordingly, the user can use the element 438 to enter an upper bound value that imposes a ceiling constraint on the value of the driver variable. As a result, any machine learning function that is executing to output a target value (given certain driver variable values) or updated driver variable values (in a target seeking scenario) will calculate the requested values based on the ceiling constraint on the driver variable's value. A user can also enter a numeric value using element 432, constraining the driver variable's value to a single number (e.g., 2000). A user can also enter a percentage-based constraint using element 434, constraining the driver variable's value to the current value adjusted by the entered percentage (e.g., current value+10%, current value−30%). Based on the constraint inputs, the user interface 400 generates the abovementioned state specification that then forms part of a query. The results of the query can indicate, for example, updated target values that result from the constrained driver variables.

As shown, the user interface 400 also includes target seeking element 450. In some implementations, target seeking element 450 can be used to perform a hypothetical, "what-if" analysis. The target seeking element 450 provides different options for setting the hypothetical target variable value. The target seeking element 450 may provide up/down arrows, sliders, dials, text boxes or other graphical user interface elements that enable text or graphical input for setting a target variable value. For example, the target seeking element 450 may provide the option to maximize the target variable value. The target seeking element 450 may provide the option to minimize the target variable value. The target seeking element 450 may provide the option to double the target variable value, halve it, increase it or decrease it by a certain percentage value or numerical value, and so on. In some implementations, the user interface 400 may be configured to dynamically update the options provided by the target seeking element 450 based on the target variable that is selected using target variable selection element 402. Target seeking element 450 may be presented or dynamically updated in response to the selection of a target variable using target variable selection element 402.

In some implementations, the user interface 400 includes target value entry element 452. Instead of manipulating the target variable value using target seeking element 450 (e.g., by providing input to maximize or double it, etc.) the user may simply enter a specific target value using target value entry element 452. For example, FIG. 4 shows that a user has entered the value '1000'. As described above, this value of '1000' will then be included in a state specification and then included during a machine learning model's calculations of the driver variable values required for the target variable to achieve a value of '1000'.

In some implementations, the user interface 400 includes original target value element 454 and achieved target value element 458, which may be data presentation elements rather than data entry elements. For example, the original target value element 454 indicates a current value of the target variable, such as 41.89% as shown in FIG. 4, which expresses a successful deal closing rate out of all customer deal-making interactions involving a potential deal closing. In an example, a user wishes to maximize the target variable value. When the option to "Maximize" is selected (using target seeking element 450), user interface 400 may be configured to present the maximum possible value for the target variable using achieved target value element 458.

In some implementations, the user interface 400 includes confidence level element 458. Confidence level element 458 may be configured to present a confidence level associated with the machine learning model or model execution that produced the achieved target value shown by achieved target value element 458. In some implementations, a machine learning model may be configured to output a requested value (e.g., a predicted target variable value) and also a confidence level expressing an accuracy or precision level of the model used to generate the requested value. For example, as shown in FIG. 4, the machine learning model may indicate a confidence level of 95% with respect to a calculation that indicates a maximum possible target value.

The user interface 400 includes top driver element 460. In some implementations, selections from one or more of the other UI elements may cause presentation of an identifier or value of a driver variable whose importance or correlation to the selected target variable is greatest. For example, selection of the "Deal Closed" target variable may cause the user interface 400 to generate a state specification that is included in a first query, executed by the query execution engine 126. The aforementioned first query may be configured to calculate, using a machine learning model one or more driver importance values associated with the selected target variable. The query execution engine 126 may be configured to identify the driver variable having the highest correlation to the target variable. The query execution engine 126 may provide values for this driver variable to the user interface 400, which presents the values using top driver element 460.

In some implementations, the top driver variable may differ based on what scenario is under consideration. For example, under current conditions, FIG. 4 shows that 'Renewal' is the top driver associated with the 'Deal Closed' target variable, with a value of 4644, or the sum of all renewal actions for the accounts shown in dataset table view 480. However, there may be situations in which another driver variable's importance to the target variable is higher. For example, where the user wishes to see a scenario where 'Deal Closed' values fall by 50%, it may be that a different driver has the highest correlation to the target variable. Accordingly, user interface 400 may configured to resubmit a state specification to the query execution engine 126 each time there is a selection or interaction with user interface 400 that causes a state change. For example, if the user selects 'Deal Closed' using target selection variable element 402, the top driver may be 'Renewal' under current conditions. But if the user selects, for example, 'Reduce by 50%' using target seeking element 450, the user interface 400 may be configured to resubmit an updated state specification with the 'Reduce by 50%' objective, which may result in a second query that may result in a different calculation using the machine learning models. As a result, a different top driver identifier and value may be presented using top driver element 460.

In some implementations, the user interface 400 includes suggested driver value elements 475. As noted above, a user selects a hypothetical state for a target variable using target seeking element 450, such as the hypothetical state where the target variable value is the maximum possible value based on currently available data. Based on the selected scenario, the query execution engine 126 may execute a query whose query result may used in the calculations of a machine learning model that is configured to provide the corresponding values for one or more driver variables. In other words, the machine learning model calculates what the values for these driver variables would have to be for the target variable to achieve the user's desired value (e.g., a maximized value). These predicted values for the driver variables are presented using suggested driver value elements 475, which include elements 472, 474, 476 corresponding to three exemplary driver variables.

As shown, the user interface 400 also includes dataset table view 480. The user interface 400 may present all or part of a dataset that is being used by a machine learning model to generate driver importance values and/or changed target variable values. In the dataset table view 480, every row may represent, for example, a prospective customer and every column represents the counts of activities that prospects performed such as Chats, Meetings attended, etc. The Deal Close state of each prospective customer is also provided in dataset table view 480.

The abovementioned systems and methods improve the operation of the computer system by providing an interactive visual data analysis system that reduces computer processing that is required in known systems to first transform, filter, and "slice and dice" data so that it is comprehensible to a business user who is unfamiliar with complex computer data analysis tools, machine learning algorithms, and computer systems in general. The front-end user interface coupled to the query execution engine and machine learning system obviate the need for a computer system that receives query inputs (e.g., using a query editor). Moreover, the operation of the computer system is further improved because the database need not be stored on the same client computing system that presents the user interface. Rather, the disclosed systems and methods provide a client-server architecture where any client device can use the user interface 400 to perform various decision analysis tasks without requiring import of the data or an access to or understanding of the underlying querying and machine learning systems.

Figure 5:
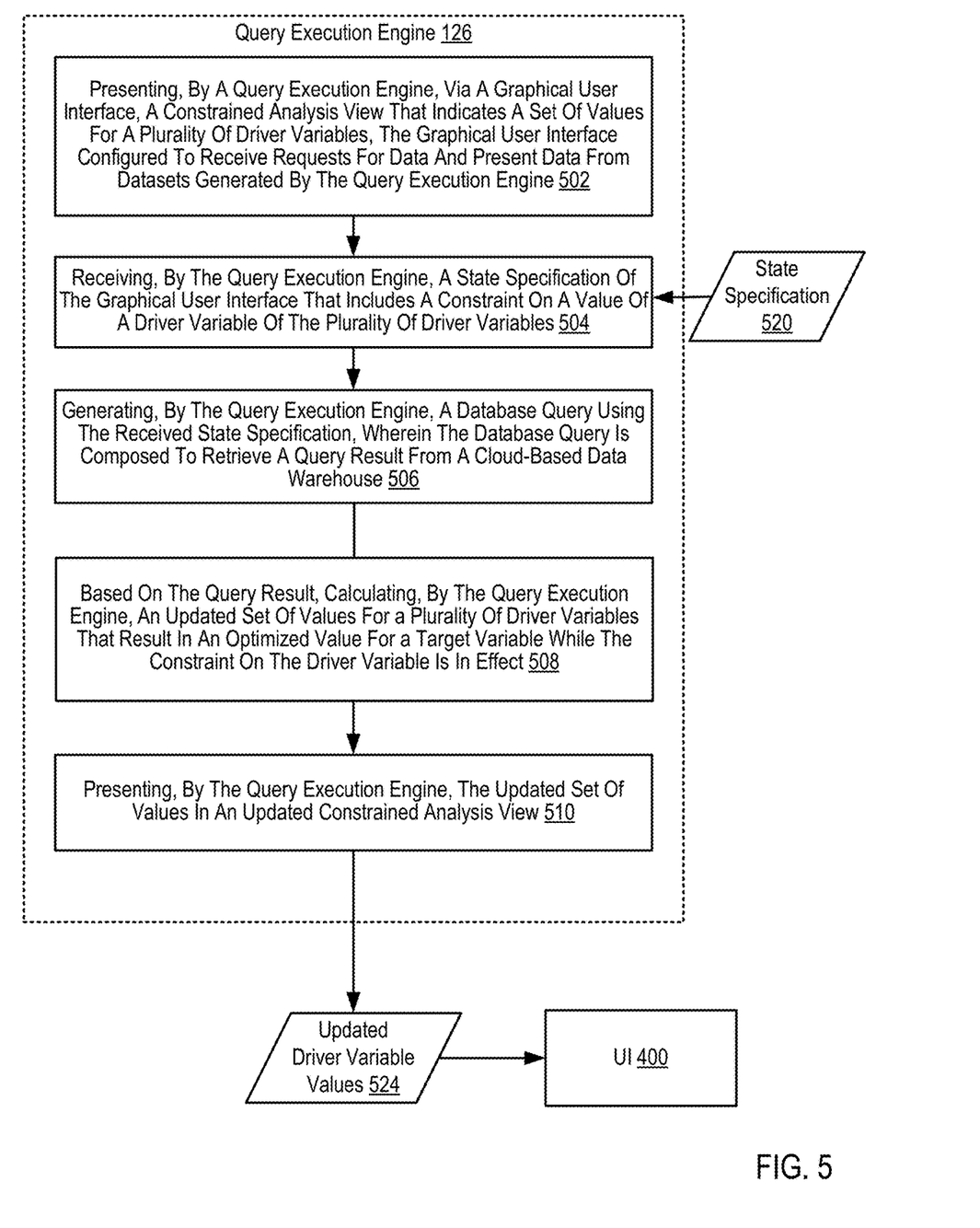
FIG. 5 sets forth a flow chart illustrating an exemplary method for augmenting decision-making via interactive what-if analysis according to embodiments of the present invention.

For further explanation, FIG. 5 sets forth a flow chart illustrating a further exemplary method for augmenting decision-making via interactive what-if analysis according to embodiments of the present invention that includes presenting 502, by a query execution engine, via a graphical user interface, a constrained analysis view that indicates a set of values for a plurality of driver variables, the graphical user interface configured to receive requests for data and present data from datasets generated by the query execution engine; receiving 504, by the query execution engine, a state specification of the graphical user interface that includes a constraint on a value of a driver variable of the plurality of driver variables; generating 506, by the query execution engine, a database query using the received state specification, wherein the database query is composed to retrieve a query result from a cloud-based data warehouse; based on the query result, calculating 508, by the query execution engine, an updated set of values for a plurality of driver variables that result in an optimized value for a target variable while the constraint on the driver variable is in effect; and presenting 510, by the query execution engine, the updated set of values in an updated constrained analysis view.

As noted above, the method of FIG. 5 includes presenting 502, by a query execution engine, via a graphical user interface, a constrained analysis view that indicates a set of values for a plurality of driver variables, the graphical user interface configured to receive requests for data and present data from datasets generated by the query execution engine. Presenting a GUI including a constrained analysis view can include, for example, presentation of user interface 400, shown in FIG. 4. User interface 400 may include UI elements such as constrained analysis element 430 that can be used to make selections of various constraints on values for one or more driver variables. The constrained analysis view can also present a dataset table view that indicates current values of driver variables that are correlated with a target variable.

The method of FIG. 5 also includes receiving 504, by the query execution engine, a state specification of the graphical user interface that includes a constraint on a value of a driver variable of the plurality of driver variables. For example, the user may use elements 436 and 438 to make selections such as Driver Variable: 'Renewal', Lower Bound: '1000', Upper Bound: '3000', or the like. These selections constrain the value of the 'Renewal' driver variable to be between 1000 and 3000 inclusive. The user interface 400 can then compile a state specification that includes a collection of data describing these inputs. The state specification may include manipulations of GUI elements within the GUI 202 along with data entered into the GUI 202 by a user. The state specification may be a standard file format used to exchange data in asynchronous browser-server communication. For example, the state specification may be a JavaScript Object Notation specification.

The method of FIG. 5 also includes generating 506, by the query execution engine, a database query using the received state specification, wherein the database query is composed to retrieve a query result from a cloud-based data warehouse. Generating the database query using the received state specification can include transforming the state specification (which may be a JSON specification) into a different data structure, such as an abstract syntax tree. The abstract syntax tree may then be canonicalized into another structure, such as a canonicalized hierarchy. In some implementations, the query may be a SQL query that is executed against a relational database. Accordingly, the canonicalized hierarchy may then be lowered into a relational algebra, which may then be lowered into the database query.

Prior to a selection of an updated target value using target seeking element 450 or target value entry element 452, the user interface 400 may present a current value of a selected target variable, such as 41.89% as shown in FIG. 4 using original target value element 454. The user may also select an optimization for the target variable, such as 'Maximize' using target seeking element 450. In other words, the user wishes to know the maximum deal closing percentage in a scenario where the 'Renewal' levels are between 1000 and 3000 includes. Accordingly, the query execution engine 126 may execute a query with the above constraint on 'Renewal', which results in a machine learning system generating an optimized target value based on the 'Renewal' driver variable being constrained between 1000 and 3000 inclusive.

The method of FIG. 5 also includes based on the query result, calculating 508, by the query execution engine, an updated set of values for the plurality of driver variables that result in an optimized value for the target variable while the constraint on the driver variable is in effect. The machine learning system may be configured to output an optimized target value for the target variable, given the provided constraints on a driver variable. More specifically, the machine learning model may calculate the value of a target variable that would be achieved if a particular driver variable is constrained by one or more bounds. For example, the machine learning model may calculate that the maximum possible deal closing percentage is 75.32% if 'Renewal is bounded between 1000 and 3000 inclusive.

The method of FIG. 5 also includes presenting 510, by the query execution engine, the updated set of values in an updated constrained analysis view. As shown in FIG. 4, the user interface 400 may present updated values for a number of driver variables using suggested driver value elements 475. For example, the machine learning model may be configured to output hypothetical updated driver variable values for one or more driver variables that are correlated to the target variable, given the constraint on one of the driver variables as mentioned above. These suggested values may be for driver variables that include the driver variable that is constrained. For example, where 'Renewal' is constrained between 1000 and 3000 inclusive and a maximum target value for 'Deal Closing' is desired, suggested driver value elements 475 may present a suggested value of "3000" for 'Renewal', a suggested value of "500" for 'Open Marketing Email', and a suggested value of "6" for Chat. A user can then review these values and determine whether to enact real world changes in order to achieve the desired target (e.g., by changing the quantities for a driver of the value of the target variable).

Figure 6:
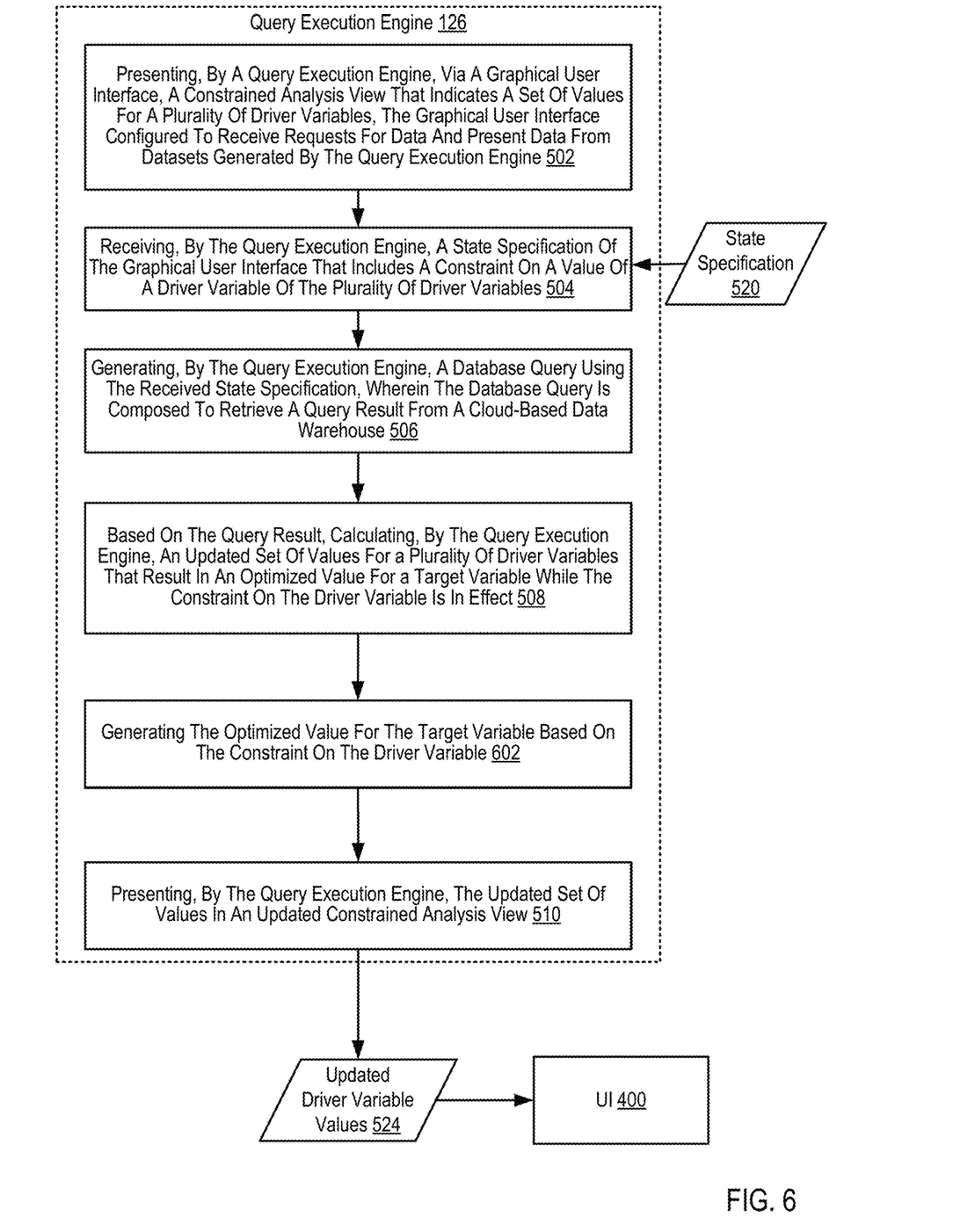
FIG. 6 sets forth a flow chart illustrating an exemplary method for augmenting decision-making via interactive what-if analysis according to embodiments of the present invention.

For further explanation, FIG. 6 sets forth a flow chart illustrating a further exemplary method for augmenting decision-making via interactive what-if analysis according to embodiments of the present invention. The method of FIG. 6 is similar to that of FIG. 5 in that the method of FIG. 6 also includes presenting 502, by a query execution engine, via a graphical user interface, a constrained analysis view that indicates a set of values for a plurality of driver variables, the graphical user interface configured to receive requests for data and present data from datasets generated by the query execution engine; receiving 504, by the query execution engine, a state specification of the graphical user interface that includes a constraint on a value of a driver variable of the plurality of driver variables; generating 506, by the query execution engine, a database query using the received state specification, wherein the database query is composed to retrieve a query result from a cloud-based data warehouse; based on the query result, calculating 508, by the query execution engine, an updated set of values for a plurality of driver variables that result in an optimized value for a target variable while the constraint on the driver variable is in effect; and presenting 510, by the query execution engine, the updated set of values in an updated constrained analysis view.

The method of FIG. 6 differs from the method of FIG. 5, however, in that the method also includes generating 602 the optimized value for the target variable based on the constraint on the driver variable. As mentioned above, the user interface 400 can receive a selection such as 'Maximize' that is then included in a state specification which is manipulated into a database query. The query execution engine 126 then executes the query to obtain a query result based on a machine learning model configured to use the selection of 'Maximize' for the target variable as an input and determine, for example, a maximum possible value of the target variable given the input data. For example, the machine learning model may use a sequential model-based optimization strategy that uses a Bayesian optimizer. Additionally, the constraint on a driver variable may also be an input into the machine learning function. For example, the machine learning function may be configured to accept, as input, target variable identifier, an optimization input for the target variable, a driver variable identifier, and a constraint on a value of the driver variable. The machine learning function may be configured to exclude certain data from its calculations that does not meet the inputted constraint. Alternatively, the query execution engine 126 may be configured to exclude data that fails to satisfy the constraint from the training data that is provided to the machine learning function in order to train the function to produce the desired outputs.

Figure 7:
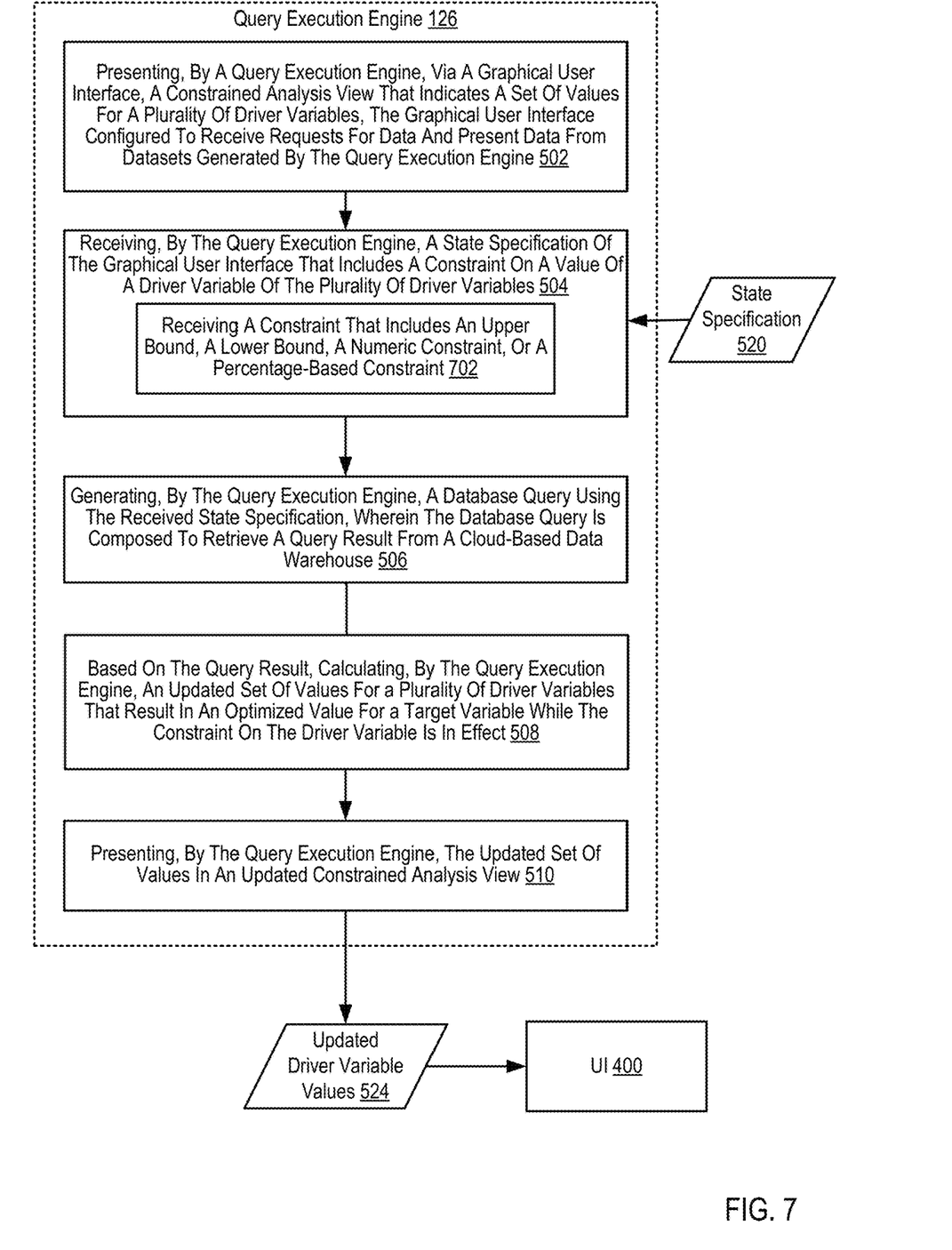
FIG. 7 sets forth a flow chart illustrating an exemplary method for augmenting decision-making via interactive what-if analysis according to embodiments of the present invention.

For further explanation, FIG. 7 sets forth a flow chart illustrating a further exemplary method for augmenting decision-making via interactive what-if analysis according to embodiments of the present invention. The method of FIG. 7 is similar to that of FIG. 5 in that the method of FIG. 7 also includes presenting 502, by a query execution engine, via a graphical user interface, a constrained analysis view that indicates a set of values for a plurality of driver variables, the graphical user interface configured to receive requests for data and present data from datasets generated by the query execution engine; receiving 504, by the query execution engine, a state specification of the graphical user interface that includes a constraint on a value of a driver variable of the plurality of driver variables; generating 506, by the query execution engine, a database query using the received state specification, wherein the database query is composed to retrieve a query result from a cloud-based data warehouse; based on the query result, calculating 508, by the query execution engine, an updated set of values for a plurality of driver variables that result in an optimized value for a target variable while the constraint on the driver variable is in effect; and presenting 510, by the query execution engine, the updated set of values in an updated constrained analysis view.

The method of FIG. 7 differs from the method of FIG. 5, however, in that the method of FIG. 7 includes receiving 702 a constraint that includes an upper bound, a lower bound, a numeric constraint, or a percentage-based constraint. Readers will appreciate that a user can enter a variety of inputs to constrain the value of a driver variable. Receiving a constraint as described above can include a scenario where a user selects a driver variable (using driver variable selection elements 410) and then enters values using text input or through graphical elements that represent constraints on a value for the selected driver variable. For example, a user can provide, for example, a floor value or ceiling value for a driver variable. The user may be an experienced business professional whose domain knowledge indicates that a driver variable's value either does not drop below a certain lower bound or does not exceed a certain upper bound, or that any scenario involving a value outside the lower or upper bounds would not be feasible or realistic in the business user's view. Accordingly, the user can enter lower or upper bound values that impose a floor or ceiling constraints on the value of the driver variable. As a result, any machine learning function that is executing to output a target value (given certain driver variable values) or updated driver variable values (in a target seeking scenario) will calculate the requested values based on the floor or ceiling constraint on the driver variable's value. The user can also enter a numeric value using element 432, constraining the driver variable's value to a single number (e.g., 2000). A user can also enter a percentage-based constraint, constraining the driver variable's value to the current value adjusted by the entered percentage (e.g., current value+10%, current value−30%). Based on the constraint inputs, the user interface 400 generates the abovementioned state specification that then forms part of a query. The results of the query can indicate, for example, updated target values that result from the constrained driver variables.

In view of the explanations set forth above, readers will recognize that the benefits of augmenting decision-making via interactive what-if analysis according to embodiments of the present invention include:
  Improving the operation of a computing system by providing an interactive visual data analysis system that reduces computer processing required for transforming data so that it is comprehensible to a user unfamiliar with complex computer data analysis tools, machine learning algorithms, and computer systems in general. The front-end user interface coupled to the query execution engine and machine learning system obviate the need for a computer system that receives query inputs (e.g., using a query editor). Moreover, the operation of the computer system is further improved because the database need not be stored on the same client computing system that presents the user interface. Rather, the disclosed systems and methods provide a client-server architecture where any client device can use the user interface to perform various decision analysis tasks without requiring import of the data or an access to or understanding of the underlying querying and machine learning systems.

Exemplary embodiments of the present invention are described largely in the context of a fully functional computer system for augmenting decision-making via interactive what-if analysis. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
   presenting, by a query execution engine, via a graphical user interface, a constrained analysis view that indicates a set of values for a plurality of driver variables that effect a target variable, the graphical user interface configured to receive requests for data and present data from datasets generated by the query execution engine;
   receiving, by the query execution engine, a state specification of the graphical user interface that includes a constraint on a value of a driver variable of the plurality of driver variables;
   generating, by the query execution engine, a database query using the received state specification, wherein the database query is composed to retrieve a query result from a cloud-based data warehouse;
   based on the query result, calculating, by the query execution engine, an updated set of values for the plurality of driver variables that result in an optimized value for the target variable while the constraint on the value of the driver variable is in effect; and
   presenting, by the query execution engine, the updated set of values in an updated constrained analysis view.

2. The method of claim 1, further comprising calculating the updated set of values based on a machine learning model.

3. The method of claim 2, wherein calculating the updated set of values based on the machine learning model further comprises:
   training the machine learning model, the training comprising:
      obtaining training data sets, each training data set of historical data comprising:
         one or more values for the target variable; and
         values of driver variables associated with the one or more values for the target variable;
      training the machine learning model based on the training data sets; and
   applying the machine learning model to the plurality of driver variables to calculate the updated set of values.

4. The method of claim 2, further comprising:
   applying the constraint to the machine learning model configured to calculate the optimized value of the target variable.

5. The method of claim 2, further comprising:
   generating the optimized value for the target variable based on the constraint on the driver variable.

6. The method of claim 1, further comprising, in response to receiving the state specification that includes the constraint, determining that the constraint represents a lowest possible value of the driver variable.

7. The method of claim 1, further comprising, in response to receiving the state specification that includes the constraint, determining that the constraint represents an highest possible value of the driver variable.

8. The method of claim 1, further comprising, in response to receiving the state specification that includes the constraint, determining that the constraint represents a numeric value constraint on the driver variable.

9. The method of claim 1, further comprising, in response to receiving the state specification that includes the constraint, determining that the constraint represents a percentage value constraint on the driver variable.

10. An apparatus comprising a computer processor, a computer memory operatively coupled to the computer processor, the computer memory having disposed therein computer program instructions that, when executed by the computer processor, cause the apparatus to carry out the steps of:
    presenting, by a query execution engine, via a graphical user interface, a constrained analysis view that indicates a set of values for a plurality of driver variables that effect a target variable, the graphical user interface configured to receive requests for data and present data from datasets generated by the query execution engine;
    receiving, by the query execution engine, a state specification of the graphical user interface that includes a constraint on a value of a driver variable of the plurality of driver variables;
    generating, by the query execution engine, a database query using the received state specification, wherein the database query is composed to retrieve a query result from a cloud-based data warehouse;
    based on the query result, calculating, by the query execution engine, an updated set of values for the plurality of driver variables that result in an optimized value for the target variable while the constraint on the value of the driver variable is in effect; and
    presenting, by the query execution engine, the updated set of values in an updated constrained analysis view.

11. The apparatus of claim 10, wherein the computer program instructions further cause the apparatus to carry out the step of calculating the updated set of values based on a machine learning model.

12. The apparatus of claim 11, wherein calculating the updated set of values based on the machine learning model further comprises:
    training the machine learning model, the training comprising:
       obtaining training data sets, each training data set of historical data comprising:
          one or more values for the target variable; and
          values of driver variables associated with the one or more values for the target variable;

training the machine learning model based on the training data sets; and applying the machine learning model to the plurality of driver variables to calculate the updated set of values.

13. The apparatus of claim 11, wherein the computer program instructions further cause the apparatus to carry out the steps of applying the constraint to the machine learning model configured to calculate the optimized value of the target variable.

14. The apparatus of claim 11, wherein the computer program instructions further cause the apparatus to carry out the steps of generating the optimized value for the target variable based on the constraint on the value of the driver variable.

15. A computer program product disposed upon a non-transitory computer readable medium, the computer program product comprising computer program instructions that, when executed, cause a computer to carry out the steps of:

presenting, by a query execution engine, via a graphical user interface, a constrained analysis view that indicates a set of values for a plurality of driver variables that effect a target variable, the graphical user interface configured to receive requests for data and present data from datasets generated by the query execution engine;

receiving, by the query execution engine, a state specification of the graphical user interface that includes a constraint on a value of a driver variable of the plurality of driver variables;

generating, by the query execution engine, a database query using the received state specification, wherein the database query is composed to retrieve a query result from a cloud-based data warehouse;

based on the query result, calculating, by the query execution engine, an updated set of values for the plurality of driver variables that result in an optimized value for the target variable while the constraint on the value of the driver variable is in effect; and presenting, by the query execution engine, the updated set of values in an updated constrained analysis view.

16. The computer program product of claim 15, wherein the computer program instructions further cause the computer to carry out the steps of calculating the updated set of values based on a machine learning model.

17. The computer program product of claim 16, wherein calculating the updated set of values based on the machine learning model further comprises:

training the machine learning model, the training comprising:
obtaining training data sets, each training data set of historical data comprising:
one or more values for the target variable; and
values of driver variables associated with the one or more values for the target variable;
training the machine learning model based on the training data sets; and
applying the machine learning model to the plurality of driver variables to calculate the updated set of values.

18. The computer program product of claim 16, wherein the computer program instructions further cause the computer to carry out the steps of:

applying the constraint to the machine learning model configured to calculate the optimized value of the target variable.

19. The computer program product of claim 16, wherein the computer program instructions further cause the computer to carry out the steps of:

generating the optimized value for the target variable based on the constraint on the value of the driver variable.

20. The computer program product of claim 15, wherein the computer program instructions further cause the computer to carry out the steps of:

in response to receiving the state specification that includes the constraint, determining that the constraint represents a lowest possible value of the driver variable.

* * * * *